Feb. 17, 1953    I. PEYCHES    2,628,417
METHOD OF PREPARING PERFORATE BODIES
Filed Jan. 27, 1950
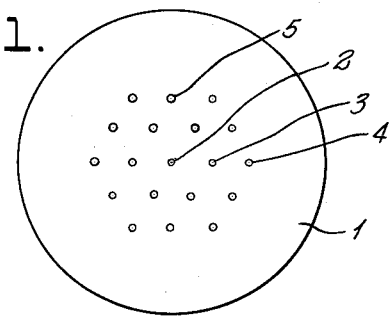
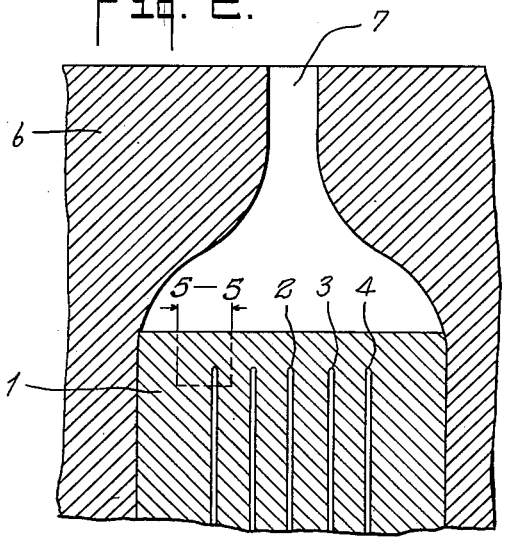
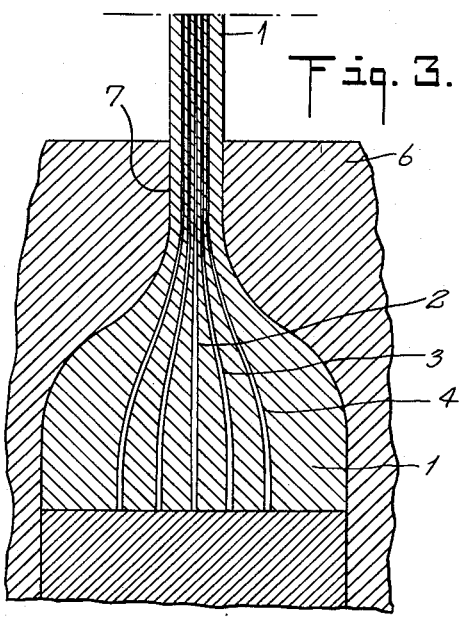
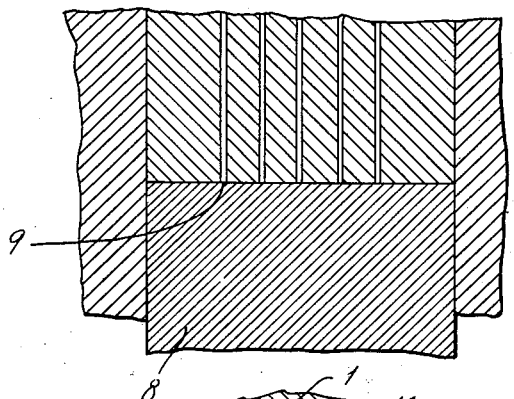
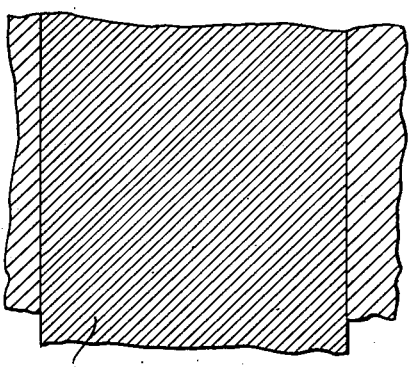
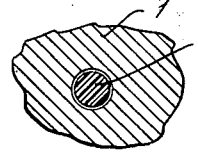
INVENTOR.
Ivan Peyches
BY
Dale A. Bauer
ATTORNEY Patented Feb. 17, 1953

2,628,417

UNITED STATES PATENT OFFICE 2,628,417

METHOD OF PREPARING PERFORATE BODIES

Ivan Peyches, Paris, France, assignor to Societe Anonyme des Manufactures des Glaces et Produits Chimiques de Saint-Gobain, Chauny & Cirey, Paris, France Application January 27, 1950, Serial No. 140,811
In France January 31, 1949

2 Claims. (Cl. 29—148)

This invention relates to a method for obtaining perforated objects having very fine orifices, and particularly relates to the method of making objects with orifices so fine that they can be produced by drilling and other prior art methods only imperfectly, with the greatest difficulty, or not at all.

There is frequently need to make, in metallic or non-metallic objects, holes of small diameter. Whenever it is desired to produce holes having a diameter less than 0.5 mm. the usual procedure is to perforate the object with metallic drills, a very difficult and delicate thing in itself made more so because of the difficulty of making the drills and because of their fragility when made. Furthermore, the known boring processes scarcely enable to make cylindrical holes in objects having a thickness which exceeds several times the diameter of the holes because the tools used for boring these holes are very fragile.

A particular example is the making of spinnerets for the manufacture of synthetic fibers under a noticeable extrusion pressure, wherein it is desirable to perforate the spinneret with minute orifices which should be regularly distributed over the extrusion area. As the spinneret must be sufficiently thick to withstand the pressure, it was necessary to reduce the length of the part of its perforations having a minute diameter by providing a conical enlargement on an important part of the length of the perforations.

It is generally desirable to make spinnerets of a very hard and refractory product in order to reduce the wear on, and enlargement of, the orifices, and this is particularly true when they are to be used at high temperature. For such uses, spinnerets have been made of metal alloys that are inoxidizable and refractory, and with such materials the drilling operation becomes yet more difficult and delicate.

The present invention allows one to obtain, by a fundamentally different process, pieces of metal, plastic, or other malleable materials, provided with minute holes of regular size and spacing. A particular object of the invention is to substitute a new and simple process of making minute holes in malleable objects to replace the delicate and onerous procedures of the past, this process enabling to obtain uniform perforations through materials having an important thickness whatever may be the diameter of these perforations.

The above and further objects and novel features of the invention will more fully appear from the following detailed description when the same is read in connection with the accompanying drawings. It is to be expressly understood, however, that the drawings are for the purpose of illustration only and are not intended to define the invention, reference for this latter purpose being had primarily to the appended claims.

In the drawings, wherein like reference characters refer to like parts through the several views:

Figure 1 is an end view of a metal cylinder provided with regularly arranged holes of sufficient diameter to be produced by ordinary drills;

Figure 2 is a vertical view through an extrusion die containing the perforated metal cylinder of Figure 1;

Figure 3 is a section corresponding to that of Figure 2 at a later stage, during the extrusion process;

Figure 4 is an end view of the extruded piece showing the minute orifices produced by the process; and Figure 5 is an enlarged sectional detail on line 5—5 of Figure 2 of a hole with an emplaced wand. The wands 9 are emplaced in the holes before reduction of the body in size.

Example

Figures 1 to 4 refer to a specific method of accomplishing the invention. In this method a metal cylinder 1, composed of an inoxidizable and refractory alloy is drilled along its axis to a size of several mm. In this case, the drilling stops without perforating both ends of the cylinder. About the central hole 2, at the apexes of a hexagon concentric with the axis are drilled six holes 3 which also stop short of the end of the cylinder. Another hexagon is provided outside the first hexagon and holes 4 are drilled at its apexes, the distance between holes 2 and 3 equaling the distance between holes 3 and 4. Midway between the apex holes 4 of the outer hexagon are drilled six other holes 5. Alloys of nickel, or stainless steel and hard type glass are useful for the cylinder and wands respectively.

The cylinder, shaft, or blank 1 now receives a glass wand in each of the holes. These wands may be of sufficient size to substantially fill the hole or they may be of smaller size if desired. In this example the cylinder was originally 150 mm. long and 145 mm. in diameter, there were 19 holes of 6.5 mm. diameter and 120 mm. depth, spaced 13 mm. between axes. The glass wands were 6 mm. in diameter. The cylinder is then placed in an extrusion die 6 having a reduced orifice 7 of 20 mm. in diameter through which the metal may be forced by plunger 8. With some materials of sufficient malleability extrusion may be successfully accomplished in the cold, but with the high refractory metal of this particular example, and the use of a high refractory glass, the cylinder and its glass wands were subjected to a preliminary heating on the order of 1300° C., which improves the malleability of the metal and the plasticity of the glass. The hot cylinder is placed in the die 6 and a plunger 8 forces it through the orifice 7 reducing the holes 2, 3, 4, 5 to a small fraction of their original size.

The perforated part of the bar resulting from the operation was 6.2 m. long, and the sectional area of the original piece was about 50 times that of the extruded object. The holes produced were about .5 mm. in diameter compared to the 6.5 mm. of their original size. They were as regularly spaced in the extruded piece as in the original, which is important because it permits the original arrangement to be retained.

In order to remove the material filling the holes, chemcials, such as, hydrofluoric acid in the case of glass, are employed, which dissolve the material without attacking the metal. Otherwise, in cases where the filling material melts at a lower temperature than the metal, the piece may be heated until this material runs out, or after sufficient plasticity is obtained it may be blown out under gas pressure after sectioning the drawn rod. A salt bath may be employed for heating the objects to the necessary temperature. It is preferred in most cases to divide the extruded piece into sections before removing the material filling the holes. This can be done by cutting the metal in the ordinary ways.

This invention is capable of use with all malleable bodies whether organic or inorganic and such malleable bodies may be used in combination with all methods of reducing the section of the body, such as rolling, spinning, wire drawing, forging, extrusion, to name some of the more important. All these processes have for effect to transform a malleable mass by reducing its perpendicular section in a selected direction, and they are characterized in that, prior to the operation one incorporates in the mass, parallel to the said direction of reduction in section, auxiliary bodies of a nature different from that of the mass and not miscible with it, resistant to compression or incompressible, and possessing to a degree at least equal to that of the mass the property of flowing at the temperature and pressure to which it is submitted in the said operation. The body thus prepared as subjected to reduction in cross-section and then the auxiliary body is removed by physical or chemical methods. For the purposes of this specification such auxiliary bodies will be called rods and wands, generally.

The physical action of removing the wands may, for example, include a momentary increase in temperature to a degree sufficient to fuse the wand and allow it to flow out of the perforated piece. This flowing may be assisted by the application of pressure such as fluid pressure. Furthermore when there is a difference in coefficient of expansion, the object may be subjected to heating or cooling to a degree sufficient to permit the wands to be removed either freely or in some cases by means of tension or pressure, such as gas pressure.

Chemical action can be employed, for instance that of an acid capable of dissolving the wands while remaining inert to the material of the piece. In the first specific example the wands were inserted in holes that were pierced or formed in the malleable body.

In the general case where the fluidity of the wand at the temperature and pressure of the operation is superior to that of the body, the holes are not made to extend completely through and the part that is not perforated is placed at the head, and when extrusion is undertaken this prevents the more fluid wands from tending to escape during the reduction in section. Thus, in the case of wire drawing, when the wands tend to be moved toward the rear, the body should be disposed so that its imperforate end is on the side away from the die. In spinning, where pressure is exercised on the end of an ingot by a piston, the imperforate part of the ingot should, on the contrary, be placed next to the die.

In the special case in which the wands have the same malleability as the body, or the property of flowing at the same temperature and pressure, the perforations may extend completely through the body from end to end. In this way, the body obtained will be provided with holes extending completely through it.

The body can also be compressed upon the ends by a transverse shrinkage induced by heat, or by squeezing the mass in order to prevent its escape from the body during the constriction of said body.

The wands may be more readily removed if the object, after reduction in size, is cut in sections, preferably thin.

Any arrangement of holes may be employed and the arrangement selected may be applied to the initial cylinder or shaft, appearing in the finished article in identical relation but with reduced size and reduced spacing.

The invention contemplates a process for making holes in malleable objects, in particular metallic objects, particularly holes of minute diameter in a body submitted to an operation which reduces its perpendicular section, the process being further characterized in that prior to the reducing operation there is incorporated in the body transverse to the direction of reduction, auxiliary bodies of a nature different from that of the object and immiscible with it, and which are incompressible and possess to a degree at least equal to that of the body the property of flowing at the temperature and pressure to which they are submitted during the shrinking operation. The said composite body is subjected to an operation reducing its section transversely to the wands contained therein. The body of reduced section has its wands removed by any appropriate physical or chemical method.

The reduction to practice of the said invention also includes the following characteristics taken alone or in combination.

A. The auxiliary wands are introduced into perforated holes.

B. The holes formed in the mass are recessed.

C. The holes may extend completely through the body.

D. The holes provided in the body are closed at both ends of the piece.

E. The auxiliary bodies are glass wands.

F. The glass remaining in the holes is removed by hydrofluoric acid, by fusion or by any other appropriate physical or chemical means.

The reduction of the piece in section may be produced by compression, shrinkage, rolling, spinning, wire drawing and forging, these processes being exemplary of appropriate means.

As many apparently widely different embodiments of the present invention may be made without departing from the spirit and scope thereon, it is to be understood that the invention is not limited to the specific embodiments.

What is claimed is:

1. The method of making an object with fine holes that comprises forming a metal blank with holes of coarser size than desired in the finished product, inserting in the holes a glass wand having a softening point not materially greater than that of the blank, heating blank and wands to the softening point of the glass wands, reducing the cross section of the blank, the holes and the wands by extruding the said blank through an orifice of lesser cross sectional area than the blank, dividing the extruded piece into sections, and removing the lengths of the wands from the sections.

2. The method of making an object with a fine hole that comprises forming a metal blank with a hole of coarser size than desired in the finished product, inserting in the hole a glass wand having a softening point within the range of malleability of the blank, heating blank and wand until the wand has become malleable, reducing the cross section of the blank and of the wand by mechanical working such as by compression, shrinkage, rolling, spinning, drawing, forging, and removing the wand from the reduced blank.

IVAN PEYCHES.

REFERENCES CITED

The following references are of record in the file of this patent:

UNITED STATES PATENTS

| Number | Name | Date |
|---|---|---|
| 12,000 | Newman | Mar. 23, 1854 |
| 1,634,274 | Smith | July 5, 1927 |
| 1,654,936 | Jones | Jan. 3, 1928 |
| 1,943,560 | Squires | Jan. 16, 1934 |
| 1,980,716 | Colwell | Nov. 13, 1934 |
| 2,093,773 | Colwell | Sept. 21, 1937 |
| 2,169,937 | Wempe | Aug. 15, 1939 |
| 2,217,194 | Bryce | Oct. 8, 1940 |
| 2,266,349 | Wempe | Dec. 16, 1941 |
| 2,311,704 | Simison | Feb. 23, 1943 |
| 2,328,302 | Simison | Aug. 31, 1943 |
| 2,423,203 | Oldham | July 1, 1947 |
| 2,499,977 | Scott | Mar. 7, 1950 |